2,881,230
FRACTIONAL CRYSTALLIZATION PROCESS

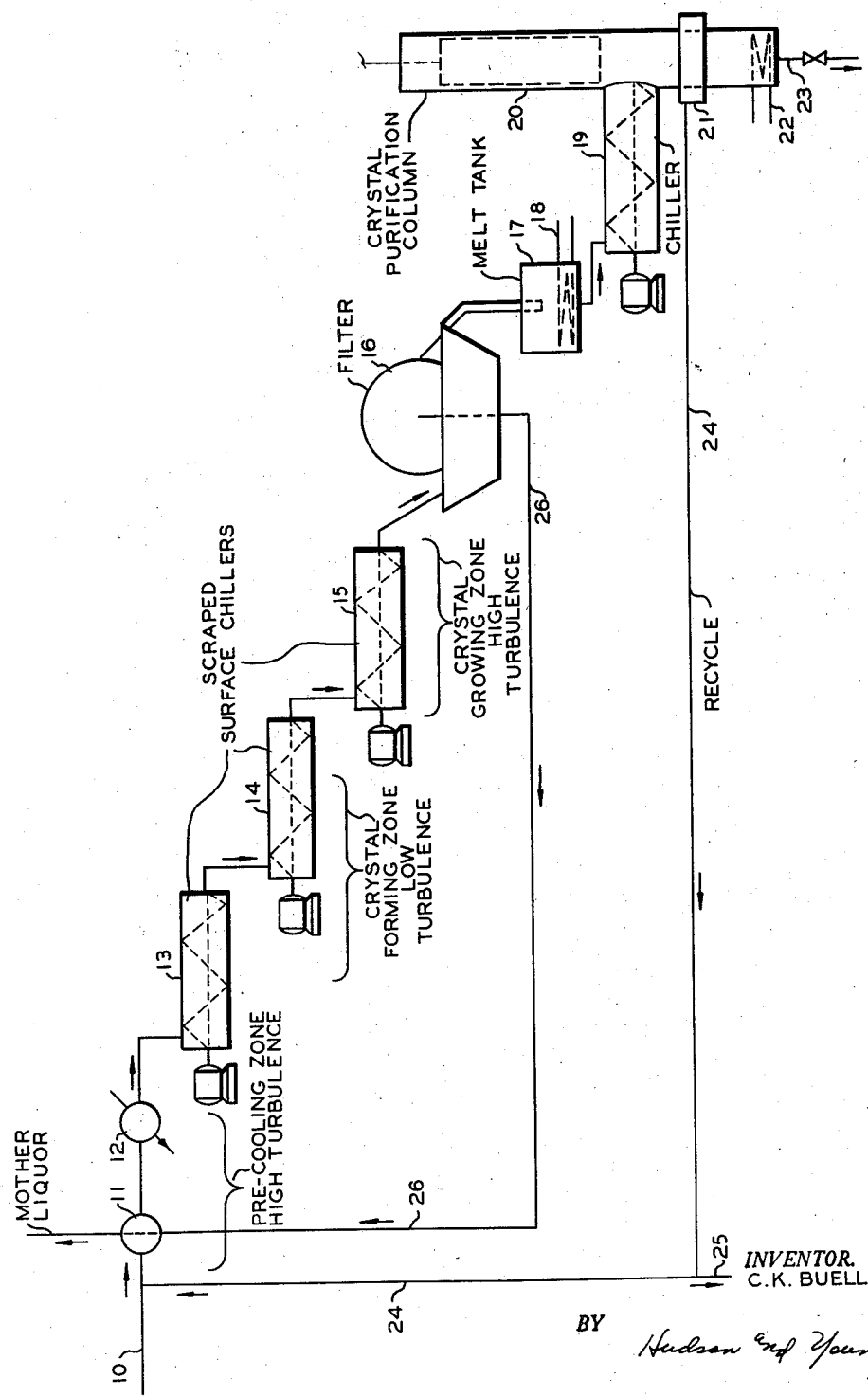

Charles K. Buell, Bartlesville, Okla., assignor to Phillips Petroleum Company, a corporation of Delaware Application September 26, 1955, Serial No. 536,693

13 Claims. (Cl. 260—674)

This invention relates to a fractional crystallization process. In one aspect this invention relates to the separation and purification of compounds of liquid multi-component mixtures by fractional crystallization. In another aspect this invention relates to a fractional crystallization process wherein the formation of needle-type crystals is substantially reduced. In still another aspect this invention relates to a fractional crystallization process wherein a liquid multi-component mixture is chilled under conditions of low turbulence during a crystal forming period and is then chilled under conditions of high turbulence during a crystal growing period so as to avoid the formation of small needle-type crystals.

In the separation of chemical compounds, fractional crystallization processes find many applications. There are many instances where separation by distillation or by solvent extraction are impracticable or impossible, and the desired separation can be carried out advantageously by means of fractional crystallization. When it is desired to separate chemical isomers having similar boiling points and solubilities, materials having relatively high boiling ranges, thermally unstable substances, or solutions containing both volatile and non-volatile impurities as undesired constituents; separation by fractional crystallization may well be the only practical method which can be employed.

There is the further advantage in using a crystallization method of separation, in that this separation method is the only one which theoretically produces a pure product in a single stage of operation. It has been found in actual practice, however, that the crystals obtained from a solution of several components are usually impure because of the occlusion of mother liquor within the crystal insterstices.

Numerous fractional crystallization processes have been proposed in order to provide for the removal of occluded impurities from the crystals. In one method of operation, a series of centrifuges are employed so as to obtain crystals of progressively increasing purity. Recently, a continuous process for separating and purifying liquid multi-component mixtures has been disclosed which utilizes a crystal purification column in one end of which a melting zone is maintained. This latter process involves cooling a liquid multi-component mixture from which the separation is to be made so as to form crystals of at least one of the components. The crystals and at least a portion of the mother liquor are then introduced into the purification column and are moved therethrough in a compact, contiguous mass toward the melting zone where the crystals are melted. A portion of the melt is withdrawn as product while the remainder is displaced as a reflux stream countercurrently to the movement of crystals, and in intimate contact therewith, so as to remove the occluded impurities. The high purity of product obtainable is due primarily to the displacement of occluded impurities by the reflux.

When separating and purifying liquid multi-component mixtures by fractional crystallization, it has been found that the crystals assume various shapes ranging from small needles to large plates, with intermediate lath-like, and granular forms. The presence of needle-like crystals can have a deleterious effect upon the operation of the particular crystal separation process utilized. The separation of this type of crystal from a slurry by filtering is very difficult. When filtering a slurry containing small, needle-like crystals, the crystals have a tendency to pass through the filter medium with the mother liquor, thereby resulting in a loss of product. When practicing a fractional crystallization process which employs a centrifuge, the small, needle-like crystals tend to leave the centrifuge along with the mother liquor.

Scraped surface chillers are well known devices for producing crystal slurries. It is also well known that such chillers normally produce a high percentage of small crystals. The scraping action apparently produces a great number of crystal nuclei, and then, especially in dilute solutions, there is not sufficient crystallizable component remaining in the solution for the crystals to grow to large size. It is believed that scraped surface chillers produce small crystals for two main reasons, (1) the agitation provided by the scrapers, together with the metal-to-metal scraping action of the scrapers against the chiller wall, and (2) a cold clean metal surface is present immediately behind the scraper and this metal surface provides considerable subcooling of the liquid, which in turn causes the precipitation of great numbers of crystal nuclei.

I have invented a process whereby the formation of small needle-type crystals in scraped surface chillers can be avoided and said chillers can be employed to produce slurries of large easily filterable crystals readily adapted for further purification. Broadly speaking, my process comprises chilling a pre-cooled liquid multi-component mixture under controlled conditions of time and temperature, and under conditions of minimum scraping and turbulence and/or agitation, to form crystal nuclei of the component which it is desired to separate; and then, chilling said chilled mixture under conditions of high turbulence so as to cause substantially complete precipitation and deposition of the crystallizable component, which it is desired to separate, on said crystal nuclei.

An object of this invention is to provide an improved process for the separation and purification of components of liquid multi-component mixtures. Another object of this invention is to provide an improved process for the separation and purification of liquid multi-component mixtures whereby the formation of small needle-like crystals is substantially reduced. Another object of this invention is to provide a fractional crystallization process wherein scraped surface chillers can be employed without the formation of small needle-like crystals. A further object of this invention is to provide an improved process for the production of para-xylene. Still another object of this invention is to provide a fractional crystallization process wherein large easily filterable crystals of para-xylene are formed. Still other aspects, objects and advantages of the invention will be apparent to those skilled in the art upon reading this disclosure.

Thus, according to the invention there is provided a process for the separation of a crystallizable component from a liquid multi-component mixture, which process comprises: chilling said mixture in a chilling zone operated under conditions of low turbulence so as to precipitate at least a portion of said component as crystal nuclei; further chilling said chilled mixture in a chilling zone operated under conditions of high turbulence to cause deposition of said crystallizable component on said crystal nuclei, thus forming a slurry of crystals of said component; passing said slurry to a separation zone; and recovering said crystals of said component.

The liquid multi-component mixture from which the crystallizable component is to be separated is usually first pre-cooled to a temperature just above that at which crystal formation begins. This pre-cooling can be carried out, if desired, in scraped surface chillers. However, it is generally preferred to carry out this pre-cooling in tube and shell type heat exchangers because such heat exchangers are more economical to install and operate than are scraped surface chillers. In any event, it is desired that this pre-cooling be carried out under high turbulence conditions for obvious reasons, i.e., it is desired to obtain maximum heat transfer rates for economic reasons. Obviously the pre-cooling could be eliminated and the feed material charged directly to the first scraped surface chiller.

It is to be noted that the pre-cooled liquid multi-component mixture is first chilled under conditions of low turbulence and is then chilled under conditions of high turbulence. As mentioned, the said pre-cooling step is not necessary but when it is used it is carried out under high turbulence conditions in tube and shell type exchangers employing flow rates which give turbulent flow.

In a presently preferred embodiment the feed is first cooled almost to the point at which crystals first begin to appear before being charged to the scraped surface chillers. The precooled feed is then fed to one or more scraped surface chillers wherein a portion of the crystallizable component is precipitated under conditions of minimum scraping and turbulence, and/or agitation, and the resulting slurry is passed to another scraped surface chiller, or chillers, wherein sufficient scraping is provided to prevent deposition of the crystallizable component on the chiller walls and sufficient cooling is provided to crystallize substantially all of the crystallizable component which is present in said mixture in an amount greater than the eutectic concentration.

Referring now to the drawing the invention will be more fully explained. As here explained the process described would be suitable for the recovery of paraxylene from a commercial stream of mixed xylenes in a two-stage process. However, the invention is not to be so limited because, as discussed further hereinafter, the invention is applicable to the recovery of any material which can be recovered from a liquid multi-component mixture by fractional crystallization. Said drawing is a schematic flow sheet illustrating one arrangement of apparatus suitable for practicing the invention. Conventional apparatus, such as pumps, valves, and the like, are not shown but the inclusion of such is within the scope of the invention.

In the drawing, feed material is introduced through line 10, mixed with recycle material from line 24 (described further hereinafter), and passed through a high turbulence pre-cooling zone comprising heat exchanger 11 and cooler 12. In said pre-cooling zone said mixture is cooled to a temperature just above that at which crystal formation begins. It will be understood that in all the cooling and chilling zones described herein sufficient refrigeration is supplied from sources not shown to provide for the proper cooling and chilling of the solution. As mentioned above, heat exchanger 11 and cooler 12 are usually shell and tube type heat exchangers and the refrigerant material can be circulated on either the shell side or the tube side as desired. In scraped surface chillers cooling is usually accomplished by passing the refrigerant material through a cooling jacket which surrounds the scraped section.

Pre-cooled mixture from cooler 12 is then passed through scraped surface chiller 13 and into scraped surface chiller 14. Said chillers 13 and 14 comprises a crystal forming zone wherein at least a portion of the crystallizable component is precipitated under conditions of low turbulence, as crystal nuclei. The scrapers in both chillers 13 and 14 can be operated either intermittently or continuously, or the scraper can be operated intermittently in one and continuously in the other. It is usually preferred to operate the scraper in chiller 13 intermittently and the scraper in chiller 14 continuously. Chiller 13 is usually operated at a "borderline" temperature when it is followed by another chiller, e.g. chiller 14, and the amount of crystallization which takes place in said chiller 13 is relatively small compared to that which occurs in chiller 14. Therefore intermittent scraping is usually preferred in chiller 13. An example of intermittent operation is to operate a two-bladed scraper for two minutes at 1 r.p.m. (resulting in two complete scrapes per minute) and then stop the scraper for 10 minutes after which the scraper is again operated for two minutes, etc., as discussed further hereinafter. (The scraping rate or frequency in chillers 13 and 14 is preferably within the range of 0 to 9 scrapes per minute, preferably 0 to 2 scrapes per minute.) The resulting slurry from chiller 14 which can comprise up to 50 percent of the crystallizable component in the solid phase is then passed to chiller 15, operated under high turbulence conditions, and which comprises a crystal growing zone. In chiller 15 the scraper is operated at a considerably faster scraping rate or frequency in order to provide said high turbulence conditions. Said scraping rate or frequency is preferably in the range of 10 to 60 scrapes per minute, more preferably about 40 to 60 scrapes per minute. Substantially all of the remaining crystallizable component above the eutectic concentration is precipitated in a rapid and efficient manner by cooling to a temperature slightly above the eutectic temperature and thereby causing a major portion of the precipitated component to deposit on the crystal nuclei formed in chillers 13 and 14, i.e., the zone of minimum or no turbulence.

The resulting slurry from chiller 15 is passed to filter 16, which is preferably a rotary filter such as an Oliver, and the mother liquor is separated from the crystal mass. Separation means other than rotary filters, such as centrifuges, can be employed alternatively if desired. Said mother liquor is removed through line 26 and passed through heat exchanger 11 wherein it serves to partially cool the incoming feed, after which it is passed to other uses not shown. The crystal mass from filter 16 is passed to melt tank 17 wherein at least a portion of the solids are melted by means of heat supplied by heater 18. If all of said solids are not melted in melt tank 17 it is preferred that the resulting slurry contain not more than about 12 percent by weight solids. Slurry or melt tank 17 is then passed to scraped surface chiller 19 wherein the temperature of the mixture is lowered to a temperature at which the desired component is once again crystallized. It is usually preferred that the material chilled in chiller 19 be cooled sufficiently to result in a solids content within the range of from 35 to 45 percent by weight. The chilled material is then introduced into an upstream portion of an elongated closed purification chamber 20. In elongated chamber 20 the crystals are moved by means of the piston shown, which piston can be either imperforate, so as to result in all materials downstream thereof remaining downstream, or it can be perforate so as to move said crystals in a downstream direction while permitting liquids to flow through the piston, which liquid is then removed through a conduit (not shown) above said piston. As the compacted crystal mass is moved in a downstream direction, the downstream end of that crystal mass is heated by means of heater 22 through which hot heat exchange fluid can be passed. Other means such as electrical heaters for heating said crystals can be supplied.

As the downstream portion of the crystal mass is melted, a portion of the melt is displaced upstream through at least a portion of the crystal mass so as to displace occluded impurities from the interstices of that mass. It appears that at least a portion of the melt which is displaced into the crystal mass is refrozen on the crystals and is once again moved into heat exchange with heating element 22. Liquid which is displaced from the interstices of the crystal mass is removed through filter 21 and conduit 24. The concentration of the desired product in the stream removed through conduit 24 will determine the use which is to be made of the stream. The purified product is removed from chamber 20 through conduit 23.

When the stream removed through conduit 24 has a concentration of desired component higher than that of the feed introduced through conduit 10, it is returned to conduit 10 through conduit 24 for recrystallization of the desired component. By operating in this manner, larger crystals are obtained than can be obtained when crystallizing the desired component from a mixture in which the concentration of desired component is relatively low. When operation is such that the stream removed through conduit 24 has a low concentration of desired product, it is removed through conduit 25 for another use as desired.

It is desirable that the temperature difference between the refrigerant and the mixture being chilled in chillers 13 and 14 be small for two reasons; first, a small temperature difference prevents excessive deposition of the crystallizable component on the chiller walls when the scrapers are not operating, and second, when the scrapers are operating, the temperature of the cleaned metal wall is near the temperature of the mixture being chilled so that subcooling of said mixture is minimized. Said temperature difference can be in the range of 5 to 20° F., however, a temperature difference of about 10° F. is usually preferred. While two chillers have been illustrated as comprising the zone of low turbulence, it is obvious that one chiller or more than two chillers can be substituted for chillers 13 and 14.

In chiller 15, the zone of high turbulence, a higher temperature difference is employed. The temperature difference can be in the range of 10 to 30° F., preferably about 20° F.

It will be understood by those skilled in the art that in both the zone of low turbulence and in the zone of high turbulence the actual temperature difference employed, and the actual temperature to which the material being chilled is cooled will depend upon the crystallizable component it is desired to separate, the remaining components of the mixture, and the concentrations of the various components in the mixture.

Throughout the above description of this invention reference has been made to the "low turbulence conditions" and "high turbulence conditions." The amount of turbulence or agitation depends on the type of scraper employed, i.e., the number of blades on the scraper, and the r.p.m. at which said scraper is rotated. The scrapers in scraped surface chillers are usually constructed with from two to six blades although a three-bladed scraper has certain structural advantages. Thus, in defining "low turbulence conditions" and "high turbulence conditions" consideration must be given to both the number of blades on the scraper and the r.p.m. at which the scraper is rotated.

In a scraped surface chiller, turbulence in the mixture being chilled is created by at least three factors (1) the agitation due to the revolving scraper blades and the arms supporting said scraper blades, (2) the movement of the liquid mixture into the void space immediately behind the scraper blade and adjacent the chiller wall, and (3) the agitation or turbulence due to the movement of the mixture through the chiller. The latter is usually very small and in most cases can be ignored. As used herein and in the claims, unless otherwise specified, the term "turbulence" includes the agitation or turbulence due to all three of the above named factors.

Obviously a six bladed scraper will create more turbulence than a two bladed scraper due to the increased number of scraper blades and arms supporting the scraper blades. At one r.p.m. a two bladed scraper will provide a scraping frequency of two scrapes per minute; similarly a six bladed scraper will provide a scraping frequency of six scrapes per minute, i.e., each blade of the scraper will pass a fixed point on the chiller wall once during each revolution.

Herein and in the claims, unless otherwise specified, the term "low turbulence conditions" refers to the turbulence caused by a scraping frequency of from 0 to 9 scrapes per minute. Such conditions are sometimes referred to as "minimum scraping" or "minimum turbulence" as well as low turbulence.

Herein and in the claims, unless otherwise specified, the term "high turbulence conditions" refers to the turbulence caused by a scraping frequency of from 10 to 60 scrapes per minute, usually within the range of 40 to 60 scrapes per minute.

While this invention is particularly applicable to systems in which the solidification point of the desired pure component is considerably higher than the temperature to which the component is cooled in the liquid mixture to form crystals thereof, this procedure can be advantageously utilized in practically any system to which fractional crystallization is applicable so as to increase the efficiency of the process. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures can be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points.

| | B.p. °C. | F.p., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | 123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |
| Group D: | | |
| Aniline | 184.4 | −6.2 |
| Toluene | 110.8 | −95 |
| Benzene | 80.0 | 5.5 |

| | B.p., °C. | F.p., °C. |
|---|---|---|
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |
| | | M.p., °C. |
| Group H: | | |
| Dimethyl phthalate | 282 | 5.5 |
| Dimethyl isophthalate | ¹124 | 67 |
| Dimethyl terephthalate | 288 | 140.6 |
| Group I: | | |
| Ortho-nitrotoluene | 222.3 | α−10.6 / β−4.1 |
| Meta-nitrotoluene | 231 | 15.5 |
| Para-nitrotoluene | 238 | 51.3 |

¹ 12 mm.

Systems consisting of any combination of two or more of the components within any one of the groups can be separated by the process of the invention, as well as systems made up of components selected from different groups; for example, benzene can be separated from a benzene, n-hexane or n-heptane system in which the benzene is present in an amount greater than the eutectic concentration. In the same manner, para-xylene can be readily separated from a mixture of para- and meta-xylenes or from para-, meta-, and ortho-xylenes. Benzene can also be separated from admixture with toluene and/or aniline. Multi-component systems which can be effectively separated so as to recover one or more of the components in substantially pure form includes 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes.

This invention can also be utilized to purify naphthalene, hydroquinone (1,4-benzenediol), para-cresol, para-dichlorobenzene, and such materials as high melting waxes, fatty acids, and high molecular normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is heated to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

The following examples will serve to further illustrate the invention.

*Example I*

A feed stream comprising a mixture of isomeric alkyl benzenes containing approximately 16 percent by weight para-xylene, together with ortho- and meta-xylene, ethylenebenzene, and other hydrocarbons, is passed through a series of tube and shell type heat exchangers at a rate of 857 gallons per hour under turbulent flow conditions and cooled to a temperature of −40° F. Effluent from said heat exchangers is passed to a first scraped surface chiller equipped with a two-bladed scraper, operated intermittently, i.e., at 1 r.p.m. for 2 minutes at 10-minute intervals. A temperature difference of about 10° F. is maintained between the refrigerant which is employed to cool said chiller and the contents of the chiller. Said chiller is operated with an outlet temperature of about −46° F. Chilled effluent from said first scraped surface chiller is fed into a second scraped surface chiller, also equipped with a two-bladed scraper, which scraper is operated continuously at 1 r.p.m. A temperature difference of about 10° F. between refrigerant and material being cooled is also maintained in said second chiller, the outlet temperature of which is maintained at about −50° F. The effluent from the said second chiller contains about 2–4 percent by weight solid para-xylene in the form of crystal nuclei. Said effluent from said second scraped surface chiller is passed into a third scraped surface chiller equipped with a two-bladed scraper which is operated continuously at a speed of about 25 r.p.m. In said third chiller a temperature difference of about 20° F. is maintained between refrigerant and chiller contents and the effluent temperature is maintained at about −107° F. The effluent from said third chiller contains about 14 percent solids in the form of large crystals suitable for filtering and/or purification operations. The size of the crystals in the crystal slurry effluent from said third scraped surface chiller is in the order of 0.17 mm. x 0.04 mm.

Said slurry of crystals is passed to an Oliver rotary filter wherein the crystals are separated from the mother liquor and the separated crystals are then passed to a melting tank wherein they are heated to a temperature of about +30° F. and melted. The resulting melt is introduced at a rate of 216 g.p.h. into a fourth scraped surface chiller, the two-bladed scraper of which is operated continuously at 25 r.p.m. The outlet temperature of said fourth chiller is maintained at about 0° F. The crystal mass effluent from chiller 4, having a solids content of about 40 percent, is passed into a Schmidt type crystal purification column wherein said crystals are compacted and moved to a heating zone in the downstream portion thereof wherein said crystals are melted and the melt is raised to a temperature of about 80° F. Para-xylene having a purity of about 99 percent is removed from the downstream end of the heating zone of said purification column at a rate of 88 g.p.h. A liquid stream is removed intermediate the inlet and outlet of said column. Said removed portion of the melt, which is about 40 percent para-xylene and which is removed at a rate of about 128 g.p.h., is combined with the raw feed material being passed to said pre-cooling zone and is recycled through the system.

*Example II*

A feed stream of the same composition is that described in Example I is passed through the chilling and crystallizing system described in Example I, operated under the same operating conditions as described in Example I, except that the scrapers in said first and second scraped surface chillers are operated at 25 r.p.m. so as to provide high turbulence conditions in the crystals forming zone. Said third scraped surface chiller is operated as described in Example I, i.e., 25 r.p.m. In this operation the size of the crystals in the effluent from said third scraped surface chiller is in the order of 0.01 mm. x 0.01 mm. The crystal mass from said Oliver filter is further treated as described in Example I.

It will be noted that the crystal size in the feed to the Oliver filter in Example I is in the order of 0.17 mm. x 0.04 mm. whereas the crystal size in the feed to the Oliver filter in Example II is in the order of 0.01 mm. x 0.01 mm. The filter rate in Example II is lower than that in Example I due to the smaller crystals present in Example II.

The effect of crystal size on filtering rates is well known to those skilled in the art.

While the invention has been described as a two stage system, i.e., a system wherein the crystals are formed, separated from the mother liquor, melted, and then recrystallized, the invention is not to be limited to two stage systems. A one stage system wherein the crystals are formed as in chillers 13, 14 and 15 and then recovered or fed directly from the filter into a purification column is within the scope of the invention.

The large crystals obtained by the process of the invention are advantageous in both a two stage system and a one stage system. In a two stage system higher filter rates are obtained in the filtering operation and the operation of the purification column is more efficient due to less occluded material in the filter cake which results in a more pure melt. Said more pure melt when recrystallized forms larger crystals, due to the increased purity, which crystals also contain less impurities. A further advantage which has been observed is that the larger crystals have less tendency to fuse together in the purification column. The advantages obtained when the crystals from a one stage system are fed directly from the filtering operation into the purification column will be readily understood by those skilled in the art in view of the above discussion.

While the invention has been described as employed in connection with a Schmidt type purification column, the invention can also be employed with other methods of purifying crystals. Further details regarding the operation of the Schmidt type purification column can be found in United States Re. 23,810.

It will be apparent to those skilled in the art that various modifications of the invention can be made in view of the above disclosure and discussion. Such modifications are believed to be clearly within the spirit and scope of the invention.

I claim:

1. A process for the separation of a crystallizable component from a liquid multi-component mixture, which process comprises: chilling said mixture in a first chilling zone under low turbulence conditions to a temperature sufficient to precipitate a portion of said crystallizable component as crystal nuclei; further chilling said chilled mixture in a second chilling zone under high turbulence conditions to a temperature sufficient to precipitate additional crystallizable component and form a slurry of crystals of said crystallizable component; passing effluent from said second chilling zone to a separation zone; and in said separation zone recovering crystals of said crystallizable component.

2. A process for the separation of a crystallizable component from a liquid multi-component mixture, which process comprises: cooling said mixture in a cooling zone operated under conditions of high turbulence to a temperature approximately but yet above that at which crystals of said component form; passing said cooled mixture to a first chilling zone operated under conditions of low turbulence and therein chilling said cooled mixture to a temperature sufficient to precipitate a portion of said component as crystal nuclei; passing the product from said first chilling zone to a second chilling zone, operated under conditions of high turbulence, and further chilling said product to a temperature sufficient to precipitate additional crystallizable component and form a slurry of crystals of said component; passing said slurry to a separation zone; and recovering said crystals of said component.

3. In a process for the separation of at least one crystallizable component from a liquid multi-component mixture, wherein said mixture is chilled in a scraped surface chilling zone to form crystals of said component, the improvement which comprises: chilling said mixture in a first scraped surface chilling zone, with intermittent scraping of said surface so as to provide conditions of low turbulence, to a temperature sufficient to precipitate a portion of said component as crystal nuclei; further chilling said mixture in a second scraped surface chilling zone, with continuous scraping of said surface so as to provide conditions of high turbulence to a temperature sufficient to precipitate additional crystallizable component and form a slurry of crystals of said crystallizable component; and recovering said slurry of large crystals from said second scraped surface chilling zone.

4. In a process for the separation and purification of a crystallizable component of a liquid multi-component mixture, wherein said mixture is chilled to form a slurry of crystals of said component, and said crystals are purified in a crystal purification zone, the improvement which comprises: cooling said mixture in a cooling zone to a temperature approximately but yet above that at which crystals of said component form; further chilling said mixture in a first scraped surface chilling zone, with intermittent scraping at predetermined intervals of time so as to provide conditions of low turbulence, to a temperature sufficient for predetermined periods of time to precipitate a portion of said component as crystal nuclei; passing the product from said first scraped surface chilling zone to a second scraped surface chilling zone operated with continuous scraping of surface so as to provide conditions of high turbulence and therein further chilling said product to a temperature sufficient to precipitate additional crystallizable component and form a slurry of large well defined crystals of said component; separating said large well defined crystals; and passing said large well defined crystals to said purification zone.

5. In a process for the separation and purification of a crystallizable component of a liquid multi-component mixture, wherein said mixture is chilled to form a slurry of crystals of said component, and said crystals are purified in a crystal purification zone, the improvement which comprises: cooling said mixture in a cooling zone to a temperature approximately but yet above that at which crystals of said component form; further chilling said mixture in a first scraped surface chilling zone, with intermittent scraping at predetermined intervals of time for predetermined periods of time so as to provide conditions of low turbulence, to a temperature sufficient to precipitate a portion of said component as crystal nuclei; passing the product from said first scraped surface chilling zone to a second scraped surface chilling zone operated with continuous high speed scraping of surface so as to provide conditions of high turbulence, and therein further chilling said product to a temperature sufficient to precipitate additional crystallizable component and form a slurry of large well defined crystals of said component; separating said large well defined crystals; heating said separated crystals in a melting zone and therein melting at least a portion of same to form a second slurry having a solids content containing not more than about 12 percent by weight; recrystallizing said heated material to form a third slurry having a solids content within the range of 35 to 45 percent solids; introducing said third slurry into said purification zone; and recovering purified crystallizable component from said purification zone.

6. In a crystal purification process, a method for providing a feed slurry of crystals which comprises: passing a liquid mixture containing a component capable of being removed by crystallization to a precooling zone; precooling said mixture in said cooling zone to a temperature approximately that at which crystals of said component form, said temperature being above the temperature at which said crystals form; passing said cooled mixture to a first chilling zone and therein chilling said cooled mixture under conditions of low turbulence to a temperature sufficient to precipitate a portion of said component as crystal nuclei; passing said chilled mixture containing said crystal nuclei to a second chilling zone and therein, under high turbulence conditions, further chilling said mixture to a temperature sufficient to deposit a major portion of said component on said crystal nuclei to form a slurry of crystals of said component; and recovering said slurry of crystals as a feed slurry for said crystal purification proccess.

7. The process of claim 2 wherein the scraping frequency in said first scraped surface chilling zone is within the range of 0 to 9 scrapes per minute, and the scraping frequency within said second scraped surface chilling zone is within the range of 10 to 60 scrapes per minute.

8. The process of claim 2 wherein the scraping frequency in said first scraped surface chilling zone is within the range of 0 to 2 scrapes per minute, and the scraping frequency within said second scraped surface chilling zone is within the range of 40 to 60 scrapes per minute.

9. The process of claim 2 wherein said liquid mixture comprises para- and meta-xylenes and said crystallizable component is para-xylene.

10. The process of claim 2 wherein said liquid mixture comprises para- and meta-cymenes and said crystallizable component is meta-cymene.

11. The process of claim 2 wherein said liquid mixture comprises dimethyl isophthalate and dimethyl terephthalate and said crystallizable component is dimethyl terephthalate.

12. The process of claim 2 wherein said liquid mixture comprises para-, and meta-nitro toluenes and said crystallizable component is meta-nitro toluene.

13. The process of claim 2 wherein said liquid mixture comprises cyclohexane and 2,2-dimethylpentane and said crystallizable component is cyclohexane.

References Cited in the file of this patent

UNITED STATES PATENTS

| | | |
|---|---|---|
| 2,540,977 | Arnold | Feb. 6, 1951 |
| 2,541,682 | Arnold | Feb. 13, 1951 |
| 2,672,487 | Tegge et al. | Mar. 6, 1954 |
| 2,683,178 | Findlay | July 6, 1954 |
| 2,688,045 | Powers et al. | Aug. 31, 1954 |

OTHER REFERENCES

Weissberger: "Technique of Organic Chemistry," vol. III, pp. 429–431, 446–448 (1950).

UNITED STATES PATENT OFFICE
CERTIFICATE OF CORRECTION

Patent No. 2,881,230                                                  April 7, 1959

Charles K. Buell

It is hereby certified that error appears in the printed specification of the above numbered patent requiring correction and that the said Letters Patent should read as corrected below.

Column 3, line 70, for "comprises" read -- comprise --; column 4, line 47, after "melt" insert -- from melt --; column 10, line 19, beginning with "so" strike out all to and including "time" in line 21, same column, and insert instead -- for predetermined periods of time so as to provide conditions of low turbulence, to a temperature sufficient --.

Signed and sealed this 19th day of January 1960.

(SEAL)
Attest:

KARL H. AXLINE                                                       ROBERT C. WATSON
Attesting Officer                                                Commissioner of Patents